(12) United States Patent
Tokura et al.

(10) Patent No.: US 9,733,547 B2
(45) Date of Patent: Aug. 15, 2017

(54) BLADE DRIVING DEVICE AND OPTICAL APPARATUS

(71) Applicant: SEIKO PRECISION INC., Narashino-shi (JP)

(72) Inventors: Shoichi Tokura, Narashino (JP); Hiroshi Takahashi, Narashino (JP); Seiichi Oishi, Narashino (JP); Minori Murata, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 15/067,501

(22) Filed: Mar. 11, 2016

(65) Prior Publication Data

US 2016/0195795 A1    Jul. 7, 2016

Related U.S. Application Data

(63) Continuation of application No. PCT/JP2014/078621, filed on Oct. 28, 2014.

(30) Foreign Application Priority Data

Jan. 29, 2014    (JP) ................... 2014-014950

(51) Int. Cl.
*H04N 5/238*    (2006.01)
*G03B 9/14*    (2006.01)
(Continued)

(52) U.S. Cl.
CPC ............. *G03B 9/14* (2013.01); *G03B 9/36* (2013.01); *G03B 9/40* (2013.01); *H04N 5/2254* (2013.01)

(58) Field of Classification Search
CPC .... G03B 7/10; G03B 7/00; G03B 9/08; G03B 9/00; G03B 2205/0069; H04N 5/238; H04N 5/2353
(Continued)

(56) References Cited

U.S. PATENT DOCUMENTS 5,202,721 A * 4/1993 Kobayashi ............... G03B 7/08
                                                      396/244
6,027,261 A   2/2000 Naganuma
(Continued)

FOREIGN PATENT DOCUMENTS

JP    H10-333206       12/1998
JP    2002-182265 A1    6/2002
(Continued)

OTHER PUBLICATIONS

International Search Report for International Application No. PCT/JP2014/078621 dated Dec. 9, 2014.

*Primary Examiner* — Kelly L Jerabek
(74) *Attorney, Agent, or Firm* — Kratz, Quintos & Hanson, LLP

(57) ABSTRACT

A blade driving device includes: a board including an opening; first and second blades opening and closing the opening; first and second actuators arranged adjacent to each other and respectively driving the first and second blades, and respectively including first and second stators, first and second rotors, and first and second coils; a printed circuit board; and solder portions electrically connecting the first and second coils with the printed circuit board; wherein the solder portions includes: first and second solder portions respectively connecting one end and another end of the first coil with the printed circuit board; and third and fourth solder portions respectively connecting one end and another end of the second coil with the printed circuit board; and the (Continued)

first, second, third, and fourth solder portions face one another.

9 Claims, 6 Drawing Sheets

(51) Int. Cl.
*G03B 9/36* (2006.01)
*H04N 5/225* (2006.01)
*G03B 9/40* (2006.01)
*G03B 9/00* (2006.01)

(58) Field of Classification Search
USPC .................................. 348/357, 362–363, 367
See application file for complete search history.

(56) References Cited

U.S. PATENT DOCUMENTS

| | | | | |
|---|---|---|---|---|
| 2003/0202791 | A1* | 10/2003 | Sato | ................ G03B 9/06 396/505 |
| 2008/0037092 | A1* | 2/2008 | Umezu | ................ G02B 5/205 359/227 |
| 2008/0259200 | A1 | 10/2008 | Matsumoto | |
| 2011/0037874 | A1* | 2/2011 | Ishimasa | ................ G03B 9/14 348/229.1 |
| 2011/0129212 | A1* | 6/2011 | Yamaguchi | ............... G03B 9/20 396/463 |
| 2014/0010527 | A1 | 1/2014 | Suzuki | |
| 2014/0247387 | A1* | 9/2014 | Nakano | ................ H04N 5/2353 348/367 |
| 2015/0341574 | A1* | 11/2015 | Takahashi | ................ G03B 9/36 348/294 |

FOREIGN PATENT DOCUMENTS

| | | |
|---|---|---|
| JP | 2008-205619 A1 | 9/2008 |
| JP | 2009-175365 A1 | 8/2009 |
| JP | 2010-85436 A1 | 4/2010 |
| JP | 2013-3163 A1 | 1/2013 |

* cited by examiner

BLADE DRIVING DEVICE AND OPTICAL APPARATUS

CROSS-REFERENCE TO RELATED APPLICATION

This application is a continuation of and claims priority to International Patent Application No. PCT/JP2014/078621 filed on Oct. 28, 2014, which claims priority to Japanese Patent Application No. 2014-14950 filed on Jan. 29, 2014, subject matter of these patent documents is incorporated by reference herein in its entirety.

BACKGROUND (i) Technical Field

The present invention relates to blade driving devices and optical apparatuses.

(ii) Related Art

Japanese Unexamined Patent Application Publication No. 2009-175365 discloses a blade driving device driving different blades by respective two actuators.

The two actuators each have a coil. These two coils are soldered to a printed circuit board. In a case where points in which the two coils are soldered to the printed circuit board are arranged over a wide range, the soldering workability might deteriorate.

Further, in soldering work, flux might be scattered from the melted solder. Thus, in the case where points in which the two coils are soldered to the printed circuit board are arranged over a wide range, the flux might be scattered over a wide range.

SUMMARY

It is thus object of the present invention to provide a blade driving device suppressing broad scattering of flux and improving soldering workability, and an optical apparatus having the same.

According to an aspect of the present invention, there is provided a blade driving device including: a board including an opening; first and second blades opening and closing the opening; first and second actuators arranged adjacent to each other and respectively driving the first and second blades, and respectively including first and second stators, first and second rotors, and first and second coils; a printed circuit board; and solder portions electrically connecting the first and second coils with the printed circuit board; wherein the solder portions includes: first and second solder portions respectively connecting one end and another end of the first coil with the printed circuit board; and third and fourth solder portions respectively connecting one end and another end of the second coil with the printed circuit board; and the first, second, third, and fourth solder portions face one another.

DETAILED DESCRIPTION

Figure 1:
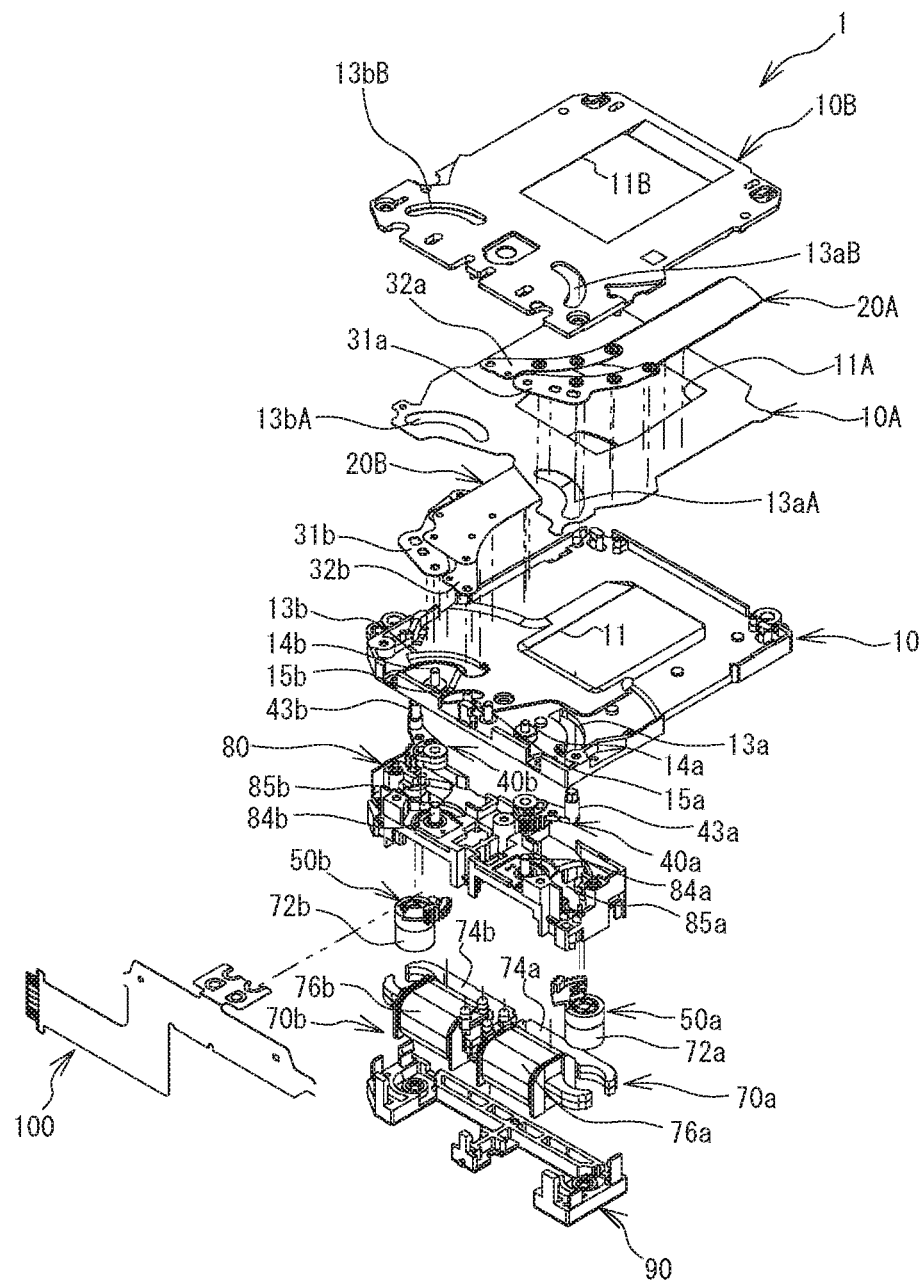
FIG. 1 is an exploded perspective view of a blade driving device according to the present embodiment.
Figure 2:
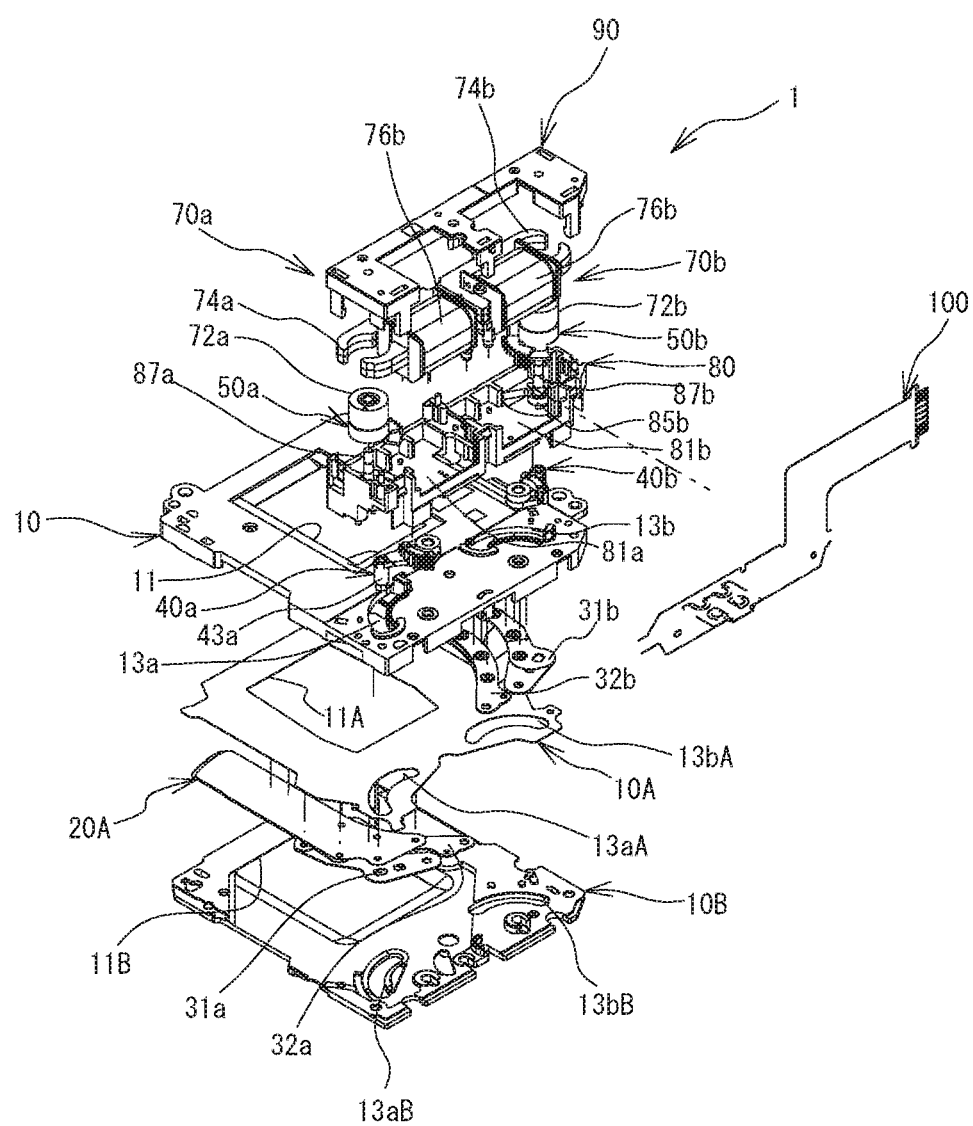
FIG. 2 is an exploded perspective view of the blade driving device according to the present embodiment.

FIGS. 1 and 2 are exploded perspective views of a blade driving device 1 according to the present embodiment. The blade driving device 1 is also referred to as a focal plane shutter. The blade driving device 1 is employed in an optical apparatus such as a digital camera or a still camera. The blade driving device 1 includes boards 10, 10A, and 10B, a leading blade 20A, a trailing blade 20B, arms 31a, 32a, 31b, and 32b, and actuators 70a and 70b. The boards 10, 10A, and 10B respectively include openings 11, 11A, and 11B. The leading blade 20A and the trailing blade 20B open and close these openings 11, 11A, and 11B. The actuators 70a and 70b drive the leading blade 20A and the trailing blade 20B, respectively.

The leading blade 20A and the trailing blade 20B each includes plural blades. Each of the leading blade 20A and the trailing blade 20B can shift between an overlapped state where the plural blades overlap one another and an expanded state where the plural blades are expanded. These plural blades in the overlapped state recede from the opening 11 to cause the opening 11 to be in a fully opened state. These plural blades in the expanded state close the opening 11 to cause the opening 11 to be in a fully closed state. FIGS. 1 and 2 illustrate the blade driving device 1 in the fully opened state.

The leading blade 20A is connected with the arms 31a and 32a. The trailing blade 20B is connected with the arms 31b and 32b. As illustrated in FIG. 2, the arms 31a, 32a, 31b, and 32b are rotatably supported by spindles 14a, 15a, 14b, and 15b provided in the board 10, respectively.

Drive members 40a and 40b drive the arms 31a and 31b, respectively. Thus, the arms 31a and 31b correspond to driven members that are driven by the drive members 40a and 40b and that drive the leading blade 20A and the trailing blade 20B, respectively. The drive members 40a and 40b are provided with drive pins 43a and 43b connected with the arms 31a and 31b, respectively. The boards 10, 10A, and 10B are respectively formed with escape slots 13a, 13aA, and 13aB for permitting the movement of the drive pin 43a. Likewise, they are respectively formed with escape slots 13b, 13bA, and 13bB for permitting the movement of the drive pin 43b. The drive members 40a and 40b will be described later in detail.

The board 10 is assembled with holders 80 and 90 holding the actuators 70a and 70b. The holder 80 is formed with support walls 81a and 81b that respectively support the actuators 70a and 70b. The holder 80 is secured on the board 10. The holders 80 and 90 are secured to each other. The holders 80 and 90 are made of a synthetic resin.

The actuator 70a includes: a rotor 72a rotatably supported by the holder 80; a stator 74a excited to generate magnetic force between the stator and the rotor 72a; and a coil 76a for exciting the stator 74a. The rotor 72a is fitted with an output member 50a. The output member 50a is connected with the drive member 40a. Therefore, the rotation of the rotor 72a drives the output member 50a and the drive member 40a to drive the arm 31a and the leading blade 20A. The actuator 70b has the same arrangement. The rotation of a rotor 72b of the actuator 70b rotates the drive member 40b to drive the trailing blade 20B.

The support walls 81a and 81b of the holder 80 are respectively formed with escape holes 85a and 85b. The escape hole 85a receives a connection portion where the drive member 40a and the output member 50a are connected with each other. Likewise, the escape hole 85b receives a connection portion where the drive member 40b and an output member 50b are connected with each other. The holder 80 is formed with spindle portions 87a and 87b for supporting the rotors 72a and 72b for rotation, respectively. A printed circuit board 100 is secured to outer portions of the holders 80 and 90. The printed circuit board 100 supplies the coils 76a and 76b with power. The printed circuit board 100 is a flexible printed circuit board with flexibility.

Figure 3:
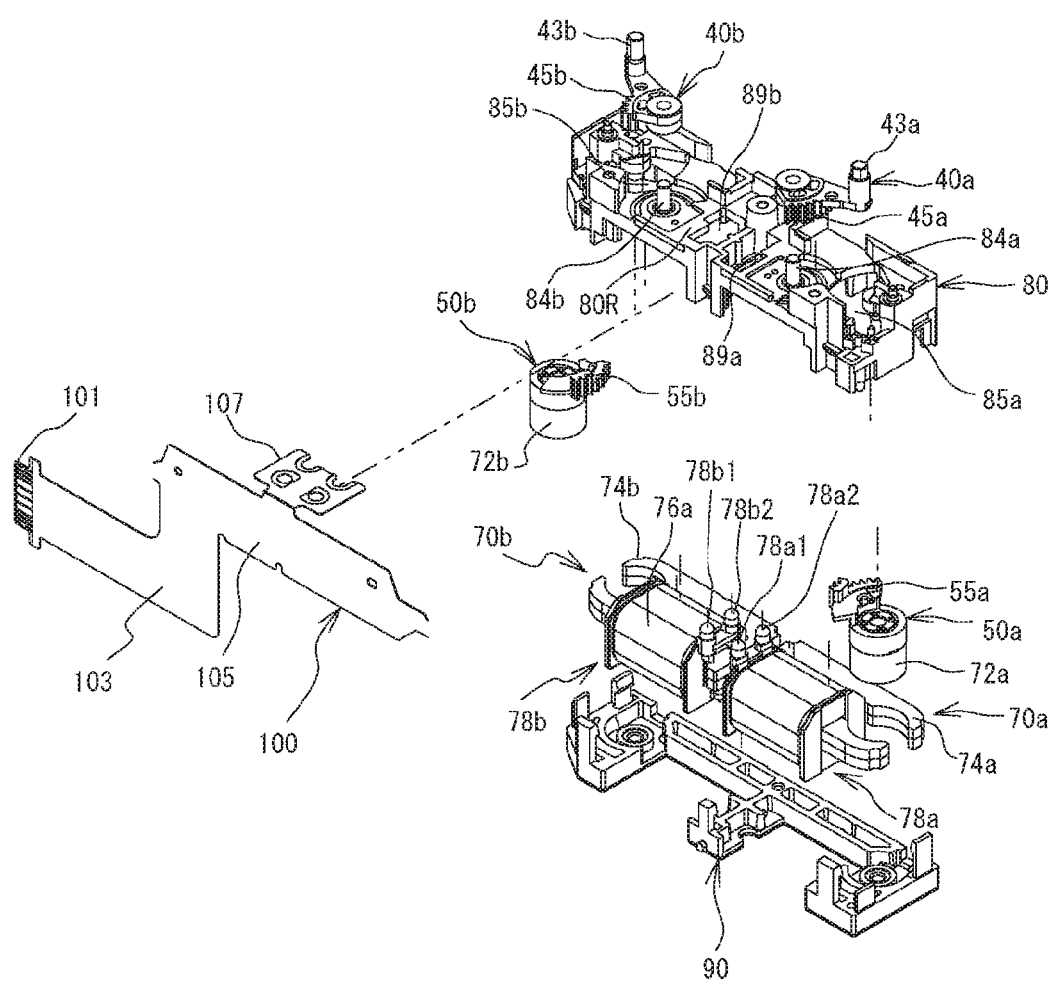
FIG. 3 is a partially enlarged view of FIG. 1.

FIG. 3 is a partially enlarged view of FIG. 1. The drive members 40a and 40b are respectively rotatably supported by spindle portions 84a and 84b provided on the holder 80. The drive members 40a and 40b are respectively provided with gear portions 45a and 45b. The output members 50a and 50b are respectively provided with gear portions 55a and 55b. The gear portions 45a and 55a mesh with each other, and the gear portions 45b and 55b mesh with each other. Thus, the rotation of the rotor 72a causes the output member 50a to drive, thereby driving the drive member 40a. The same is true for the rotor 72b, the output member 50b, and the drive member 40b.

The coil 76a and 76b are respectively wound around coil bobbins 78a and 78b. The coil bobbin 78a and 78b are respectively attached to the stators 74a and 74b. The coil bobbin 78a is provided with terminal portions 78a1 and 78a2 around which one end and the other end of the coil 76a are respectively wound. Similarly, the coil bobbin 78b is provided with terminal portions 78b1 and 78b2 around which one end and the other end of the coil 76b are respectively wound. The terminal portions 78a1, 78a2, 78b1, and 78b2 face one another and extend to the holder 80 side that is, the board 10 side. The holder 80 is formed with a receiving hole 89a for receiving the terminal portions 78a1 and 78a2, and with a receiving hole 89b for receiving terminal portions 78b1 and 78b2.

The printed circuit board 100 includes: a portion 103 provided at its one end with a connector portion 101 and attached to the holder 90 side; a portion 105 attached to the side surface of the holder 80; and an inserted portion 107 inserted between the holder 80 and the board 10. On the inserted portion 107, the pattern to which the coils 76a and 76b are connected is provided. The portions 103 and 105 are an example of exposed portions exposed to the outside of the holder 80 and 90. They will be described later in detail.

Figure 4:
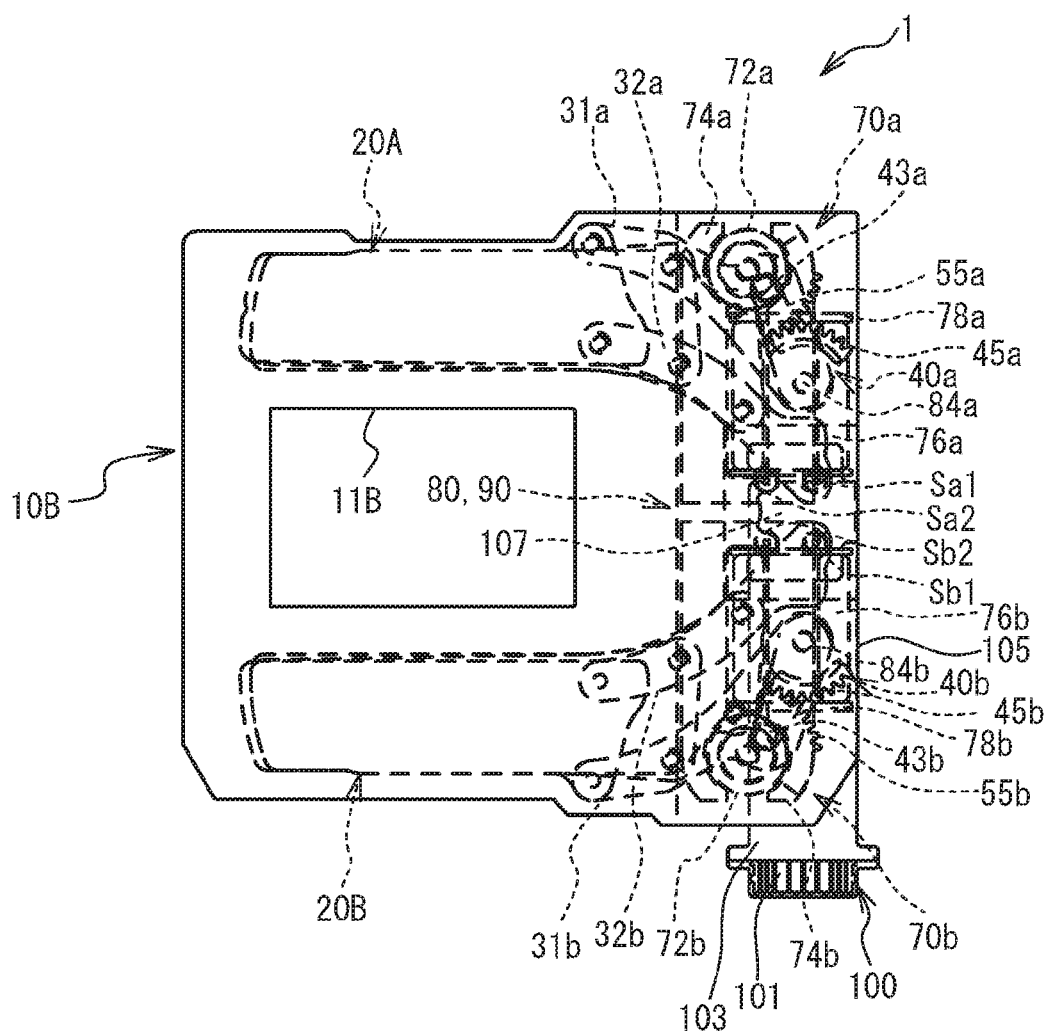
FIG. 4 is a rear view of the blade driving device after completion.
Figure 5:
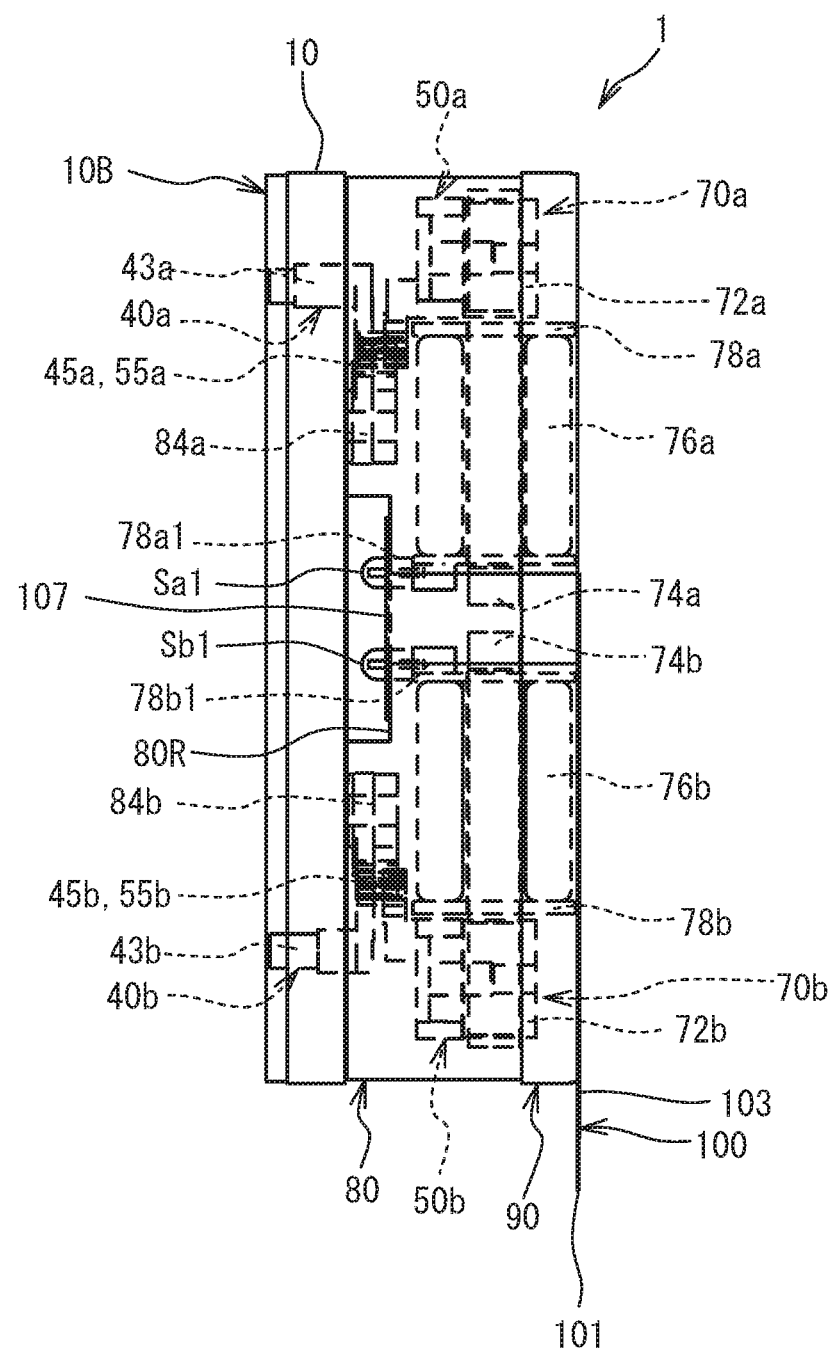
FIG. 5 is a side view of the blade driving device after completion.

FIG. 4 is a rear view of the blade driving device 1 after completion. FIG. 5 is a side view of the blade driving device 1 after completion. The terminal portions 78a1, 78a2, 78b1, and 78b2 are connected with the inserted portion 107 by soldering. Specifically, solder portions Sa1, Sa2, Sb1, and Sb2 respectively connect the terminal portions 78a1, 78a2, 78b1, and 78b2 with the inserted portion 107. That is, the solder portions Sa1 and Sa2 electrically connect one end and the other end of the coil 76a with the printed circuit board 100. The Solder portions Sb1 and Sb2 electrically connect one end and the other end of the coil 76b with the printed circuit board 100. The solder portions Sa1, Sa2, Sb1, and Sb2 are an example of solder portions. The solder portions Sa1, Sa2, Sb1, and Sb2 protrude to the board 10 side.

As illustrated in FIG. 5, a recess portion 80R is formed on the surface of the holder 80 facing the board 10. The terminal portions 78a1 and 78a2 protrude into the recess portion 80R through the receiving hole 89a as illustrated in FIG. 3. Likewise, the terminal portions 78b1 and 78b2 protrude into the recess portion 80R through the receiving hole 89b. The solder portions Sa1, Sa2, Sb1, and Sb2 are located in the recess portion 80R.

As illustrated in FIGS. 4 and 5, these solder portions Sa1, Sa2, Sb1, and Sb2 closely face one another, and are arranged together at a place. Specifically, when viewed in the optical axis direction as illustrated in FIG. 4, the solder portions Sa1, Sa2, Sb1, and Sb2 are positioned to be sandwiched between the coil bobbins 78a and 78b, and also between the drive members 40a and 40b.

Figure 6A:
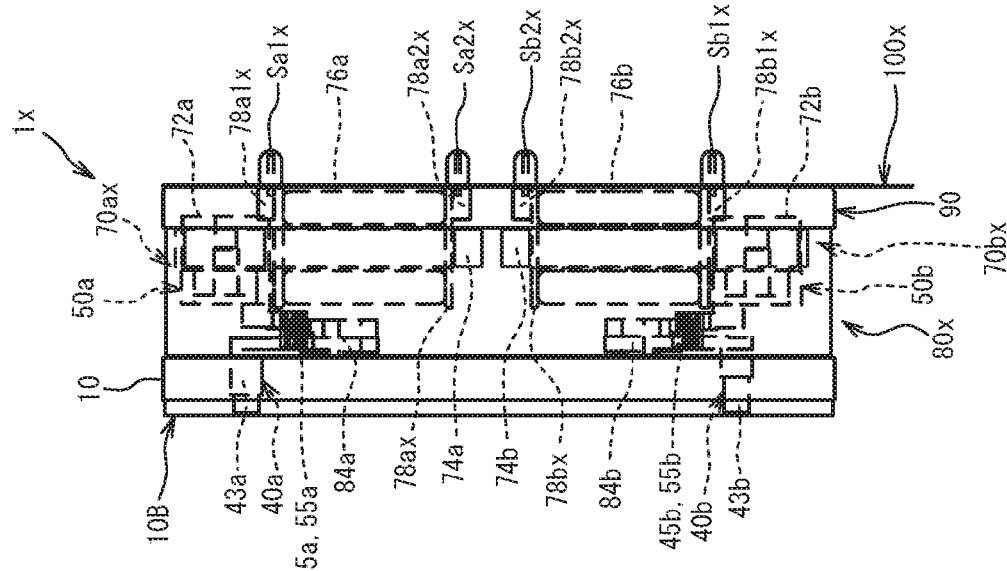
FIGS. 6A and 6B are explanatory views of a blade driving device according to a comparative example.
Figure 6B:
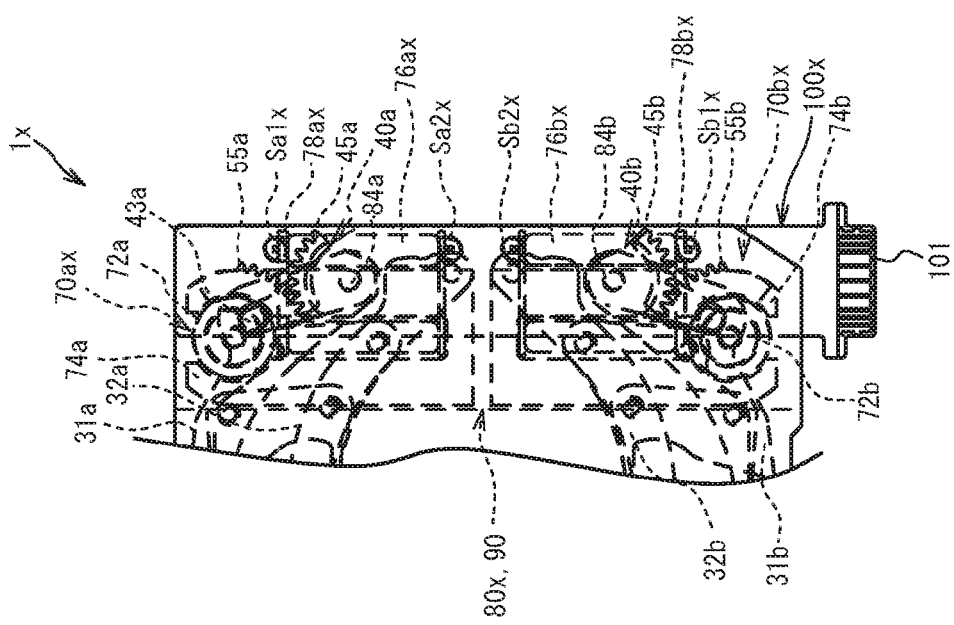

FIGS. 6A and 6B are explanatory views of a blade driving device 1x of a comparative example. Incidentally, similar components are designated with similar reference numerals and a description of those components will be omitted. Terminal portions 78a1x and 78a2x of a coil bobbin 78ax of an actuator 70ax are formed at a position to sandwich the coil bobbin 78ax, when viewed in the optical axis direction. The same is true for terminal portions 78b1x and 78b2x of a coil bobbin 78bx of an actuator 70bx. The terminal portion 78a1x of the coil bobbin 78ax and the terminal portion 78b1x of the coil bobbin 78bx are formed at a position to sandwich the two coil bobbins 78ax and 78bx. Solder portions Sa1x, Sa2x, Sb1x, and Sb2x, electrically respectively connecting such terminal portions 78a1x, 78a2x, 78b1x, and 78b2x to a printed circuit board 100x, are arranged over a wide range. Therefore, soldering workability might be deteriorated. Also, flux might be scattered over a wide range.

The scattering of the flux might degrade sliding property of a movable member located around the solder portion, which might cause a drive malfunction. In particular, the broad scattering of the flux might increase the possibility of the malfunction. Also, the removing of the flux requires cleaning over a wide range. In this way, the workability might deteriorate, so the production efficiency might decrease.

In the blade driving device 1 according to the present embodiment, the solder portions Sa1, Sa2, Sb1, and Sb2 are not formed at a position to sandwich the coil bobbin 78a and 78b, and are not formed at a position to sandwich the opening 11. The solder portions Sa1, Sa2, Sb1, and Sb2 closely face one another, and are arranged together in one place. Therefore, the soldering workability improves, so this suppresses the scattering of the flux over a wide range.

Further, as illustrated in FIG. 6B, as for the blade driving device 1x, the terminal portions 78a1x, 78a2x, 78b1x, and 78b2x extend to the upper surface side of the holder 90 and protrude outwardly, and the solder portions Sa1x, Sa2x, Sa1x, and Sb2x are also provided in the outer side of the holder 90. For this reason, careful handling of the blade driving device 1x is required. Also, when the blade driving device 1x is mounted on a camera, care must be taken so that the solder portion Sa1x and the like do not touch other components within the camera. In addition, the size of the blade driving device 1x is increased in the optical axis direction.

In the present embodiment, as illustrated in FIG. 5, the terminal portions 78a1, 78a2, 78b1, and 78b2 extend to the board 10 side, and the solder portions Sa1, Sa2, Sb1, and Sb2 face the board 10, in other words, protrude to the board 10 side and are located within the recess portion 80R. Although the solder portions Sa1, Sa2, Sb1, and Sb2 protrude to the board 10 in this way, they are not exposed to the outside. It is therefore easy to handle the blade driving device 1 according to the present embodiment, and to mount it on the camera. Also, the blade driving device 1 is thinned in the optical axis direction.

Incidentally, before the holders 80 and 90 are assembled to the board 10, the actuators 70a and 70b and the printed circuit board 100 are assembled to the holders 80 and 90.

After that, and the holders 80 and 90 are assembled to the board 10. Thus, it is possible to handle the holders 80 and 90 assembled with the actuators 70a and 70b and the printed circuit board 100 as a actuator unit, before the holders 80 and 90 are assembled to the board 10. At this time, as illustrated in FIG. 5, the terminal portions 78a1, 78a2, 78b1, and 78b2, and the solder portions Sa1, Sa2, Sb1, and Sb2 are located within the recess portion 80R, and do not protrude from a bottom surface of the holder 80. It is also easy to handle the actuator unit.

As illustrated in FIGS. 4 and 5, the drive member 40a and the output member 50a are at least partially located between the board 10, and the stator 74a and the coil 76a. Similarly, the drive member 40b and the output member 50b are at least partially located between the board 10, and the stator 74b and the coil 76b. Therefore, as illustrated in FIG. 5, the space for arranging the drive members 40a and 40b and the output members 50a and 50b is ensured between the board 10 and the actuators 70a and 70b in the optical axis direction. The recess portion 80R is formed within this space, and the solder portions Sa1, Sa2, Sb1, and Sb2 protruding to the board 10 side is also located within this space. Thus, the dead space is effectively used, thereby suppressing the increase in the thickness in the optical axis direction.

Also, as illustrated in FIG. 3, the gear portion 45a of the drive member 40a and the gear portion 55a of the output member 50a are positioned in the escape hole 85a of the holder 80. This reduces the thickness of the blade driving device 1.

Also, the size of the escape hole 85a is set so as to permit the connection between the gear portions 45a and 55a. Thus, the escape hole 85a is comparatively large. This reduces the weight of the holder 80.

Also, the gear portions 45a and 55a are connected with each other in the escape hole 85a, thereby arranging the drive member 40a and the output member 50a close to each other. This reduces the whole size of the drive member 40a and the output member 50a. Further, this reduces the total weight of the drive member 40a and the output member 50a. Thus, the blade driving device 1 is reduced in weight.

As illustrated in FIG. 4, the drive pin 43a overlaps the rotor 72a. Specifically, a part of a trajectory of the drive pin 43a overlaps the rotor 72a. The rotor 72a and the drive member 40a are arranged in such a manner, thereby reducing the size of the blade driving device 1 in the planar direction.

The rotors 72a and 72b are arranged to sandwich the coils 76a and 76b. In other words, the rotors 72a and 72b are respectively located at both ends of the holder 80 in the movable direction of the leading blade 20A and the trailing blade 20B. In such a way, although the actuators 70a and 70b are adjacent to each other, the rotors 72a and 72b are spaced apart from each other. This prevents the rotors 72a and 72b from magnetically influencing each other and from influencing the driving properties of the rotors 72a and 72b. It is therefore possible to ensure the desired driving properties of the leading blade 20A and the trailing blade 20B.

Herein, the leading blade 20A and the trailing blade 20B are an example of first and second blades. The actuators 70a and 70b are an example of first and second actuators. The rotors 72a and 72b are an example of first and second rotors. The coils 76a and 76b are an example of first and second coils. The stators 74a and 74b are an example of first and second stators. The solder portions Sa1, Sa2, Sb1, and Sb2 are an example of first, second, third, and fourth solder portions, respectively.

Additionally, the actuators 70a and 70b are arranged such the longitudinal directions thereof are the same as the movable direction of the leading blade 20A and the trailing blade 20B. Further, the actuators 70a and 70b are arranged in the longitudinal direction. Furthermore, the rotors 72a and 72b are respectively arranged at both ends of the whole region of the actuators 70a and 70b in its longitudinal direction. It is therefore possible to ensure the further interval between the rotors 72a and 72b. This prevents the rotors 72a and 72b from magnetically influencing each other and from influencing the driving properties of the rotors 72a and 72b.

The drive member 40a is arranged to overlap the stator 74a and the coil 76a in the optical axis direction. Likewise, the drive member 40b is arranged to overlap the stator 74b and the coil 76b in the optical axis direction. Therefore, the size of the blade driving device is reduced in the planar direction perpendicular to the optical axis.

The axis of the rotation of the drive member 40a overlaps the stator 74a and the coil 76a, and is positionally displaced from the axis of the rotor 72a. Similarly, the axis of rotation of the drive member 40b overlaps the stator 74b and the coil 76b, and is positionally displaced from the axis of the rotor 72b.

While the exemplary embodiments of the present invention have been illustrated in detail, the present invention is not limited to the above-mentioned embodiments, and other embodiments, variations and modifications may be made without departing from the scope of the present invention.

In the above embodiment, the solder portions Sa1, Sa2, Sb1, and Sb2 that face the board 10 and that are located within the recess portion 80R are described as an example, but they are not limited. The solder portions Sa1, Sa2, Sb1, and Sb2 may extend to the upper surface side of the holder 90, protrude to the outside thereof, and be provided outside the holder 90. Also, they may protrude to a side surface side of the holder 80 and be provided outside the holder 80. The solder portions Sa1, Sa2, Sb1, and Sb2 face one another and are arranged together in one place, thereby improving the soldering workability and suppressing the broad scattering of the flux.

In the above embodiment, the blade driving device 1 is described as an example of the focal plane shutter in which the actuators 70a and 70b respectively drive the leading blade 20A and the trailing blade 20B, but they are not limited. As for a focal plane shutter in which biasing force of springs drives the leading blade and the trailing blade, solder portions, electrically connecting the printed circuit board with electromagnets for keeping the biasing force for the leading blade and the trailing blade, may face one another and be arranged together in one place.

What is claimed is:
1. A blade driving device, comprising:
    a board including an opening;
    first and second blades opening and closing the opening;
    first and second actuators arranged adjacent to each other and respectively driving the first and second blades, and respectively including first and second stators, first and second rotors, and first and second coils;
    a printed circuit board; and
    solder portions electrically connecting the first and second coils with the printed circuit board,
    wherein the solder portions includes:
        first and second solder portions respectively connecting one end and another end of the first coil with the printed circuit board; and third and fourth solder portions respectively connecting one end and another end of the second coil with the printed circuit board; and the first, second, third, and fourth solder portions face one another, the blade driving device further comprising a holder supporting the first and second actuators and attached to the board, wherein the holder is formed with a recess portion facing the board, and wherein the solder portions protrude to the board side and are located within the recess portion.

2. The blade driving device of claim 1, wherein the printed circuit board includes:

an exposed portion exposed to an outside of the holder; and an inserted portion inserted into the recess portion and connected with the solder portions.

3. The blade driving device of claim 1, comprising:

a first output member rotating together with the first rotor; and a first drive member engaged with the first output member and driving the first blade, wherein the first output member and the first drive member are at least partially located between at least part of the first stator and the first coil, and the board, and the recess portion is at least partially located between at least part of the first stator and the first coil, and the board.

4. The blade driving device of claim 3, wherein an axis of the first drive member overlaps the first stator and the first coil, and is positionally displaced from an axis of the first rotor.

5. An optical apparatus comprising a blade driving device, the blade driving device comprising:

a board including an opening;

first and second blades opening and closing the opening;

first and second actuators arranged adjacent to each other and respectively driving the first and second blades, and respectively including first and second stators, first and second rotors, and first and second coils;

a printed circuit board; and solder portions electrically connecting the first and second coils with the printed circuit board, wherein the solder portions includes:

first and second solder portions respectively connecting one end and another end of the first coil with the printed circuit board; and third and fourth solder portions respectively connecting one end and another end of the second coil with the printed circuit board; and the first, second, third, and fourth solder portions face one another, the blade driving device further comprising a holder supporting the first and second actuators and attached to the board, wherein the holder is formed with a recess portion facing the board, and wherein the solder portions protrude to the board side and are located within the recess portion.

6. A blade driving device, comprising:

a board including an opening;

first and second blades opening and closing the opening;

first and second actuators arranged adjacent to each other and respectively driving the first and second blades, and respectively including first and second stators, first and second rotors, and first and second coils;

a printed circuit board; and solder portions electrically connecting the first and second coils with the printed circuit board, wherein the solder portions includes:

first and second solder portions respectively connecting one end and another end of the first coil with the printed circuit board; and third and fourth solder portions respectively connecting one end and another end of the second coil with the printed circuit board; and the first, second, third, and fourth solder portions face one another, and wherein the first, second, third, and fourth solder portions are sandwiched between a first bobbin of the first coil and a second bobbin of the second coil, when viewed in an optical axis direction.

7. An optical apparatus comprising a blade driving device, the blade driving device comprising:

a board including an opening;

first and second blades opening and closing the opening;

first and second actuators arranged adjacent to each other and respectively driving the first and second blades, and respectively including first and second stators, first and second rotors, and first and second coils;

a printed circuit board; and solder portions electrically connecting the first and second coils with the printed circuit board, wherein the solder portions includes:

first and second solder portions respectively connecting one end and another end of the first coil with the printed circuit board; and third and fourth solder portions respectively connecting one end and another end of the second coil with the printed circuit board; and the first, second, third, and fourth solder portions face one another, and wherein the first, second, third, and fourth solder portions are sandwiched between a first bobbin of the first coil and a second bobbin of the second coil, when viewed in an optical axis direction.

8. A blade driving device, comprising:

a board including an opening;

first and second blades opening and closing the opening;

first and second actuators arranged adjacent to each other and respectively driving the first and second blades, and respectively including first and second stators, first and second rotors, and first and second coils;

a printed circuit board; and solder portions electrically connecting the first and second coils with the printed circuit board, wherein the solder portions includes:

first and second solder portions respectively connecting one end and another end of the first coil with the printed circuit board; and third and fourth solder portions respectively connecting one end and another end of the second coil with the printed circuit board; and the first, second, third, and fourth solder portions face one another, and wherein:
first and second drive members are provided,
rotation of a first rotor drives the first drive member to drive the first blade,
rotation of a second rotor drives the second drive member to drive the second blade, and
the first, second, third, and fourth solder portions are sandwiched between the first and second drive members when viewed in an optical axis direction.

9. An optical apparatus comprising a blade driving device, the blade driving device comprising:
a board including an opening;
first and second blades opening and closing the opening;
first and second actuators arranged adjacent to each other and respectively driving the first and second blades, and respectively including first and second stators, first and second rotors, and first and second coils;
a printed circuit board; and
solder portions electrically connecting the first and second coils with the printed circuit board,
wherein the solder portions includes:
first and second solder portions respectively connecting one end and another end of the first coil with the printed circuit board; and
third and fourth solder portions respectively connecting one end and another end of the second coil with the printed circuit board; and
the first, second, third, and fourth solder portions face one another, and
wherein:
first and second drive members are provided,
rotation of a first rotor drives the first drive member to drive the first blade,
rotation of a second rotor drives the second drive member to drive the second blade, and
the first, second, third, and fourth solder portions are sandwiched between the first and second drive members when viewed in an optical axis direction.

* * * * *